United States Patent [19]
Specht

[11] 3,994,478
[45] Nov. 30, 1976

[54] ELECTRIC FENCE POST STANDARD
[76] Inventor: William Specht, R.R. No. 1, Box 9, Milledgeville, Ill. 61051
[22] Filed: July 30, 1975
[21] Appl. No.: 600,525

[52] U.S. Cl. .............................. 256/10; 174/158 F; 256/1
[51] Int. Cl.² .......................................... A01K 3/00
[58] Field of Search .................. 256/10; 174/158 F; 404/6; 40/125 M

[56] References Cited
UNITED STATES PATENTS
| | | | |
|---|---|---|---|
| 1,843,031 | 1/1932 | Kistler | 40/125 M |
| 2,797,027 | 6/1957 | Martin | 248/346 |
| 3,387,825 | 6/1968 | Kreeger | 256/10 |

FOREIGN PATENTS OR APPLICATIONS
| | | | |
|---|---|---|---|
| 1,184,406 | 2/1959 | France | 40/125 M |

Primary Examiner—Werner H. Schroeder
Assistant Examiner—Doris L. Troutman
Attorney, Agent, or Firm—Mason, Fenwick & Lawrence

[57] ABSTRACT

A portable electric fence post is disclosed for supporting a conventional electric fence wire to provide an enclosure for livestock which is easily moved and stored, said portable electric fence post includes a vehicle tire casing which lays on a side wall to form a ground support, two support members formed of concrete reinforcing rod having lower ends bent transverse to the main portion of the support member and having upper ends which are bent outwardly relative to the lower ends thereof, a post member similar to the support members except the upper end thereof is longer than the upper ends of the support members and forms the post which supports the electric fence wire, and a rubber sleeve whereby the portable electric fence post is formed by inserting the lower ends of the support members and the post member at equally spaced apart positions into the upper side wall of the tire casing and bringing the upper ends of the members together to form a tripod with the rubber sleeve surrounding a portion of the upper ends of the members with the upper end of the post member extending above the sleeve thereby providing a portable post to which the electric fence wire may be attached by any desired means.

4 Claims, 3 Drawing Figures

U.S. Patent  Nov. 30, 1976  3,994,478
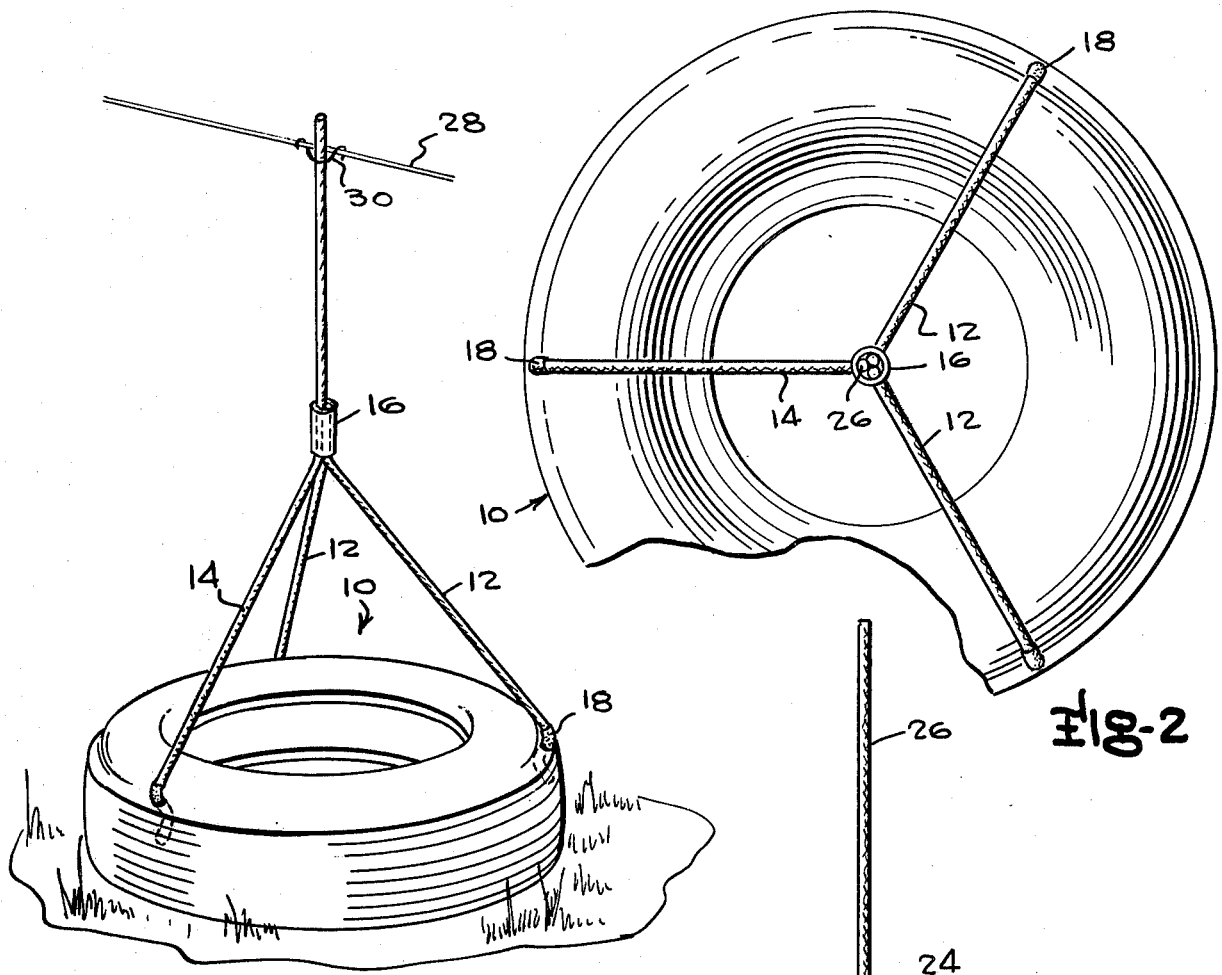
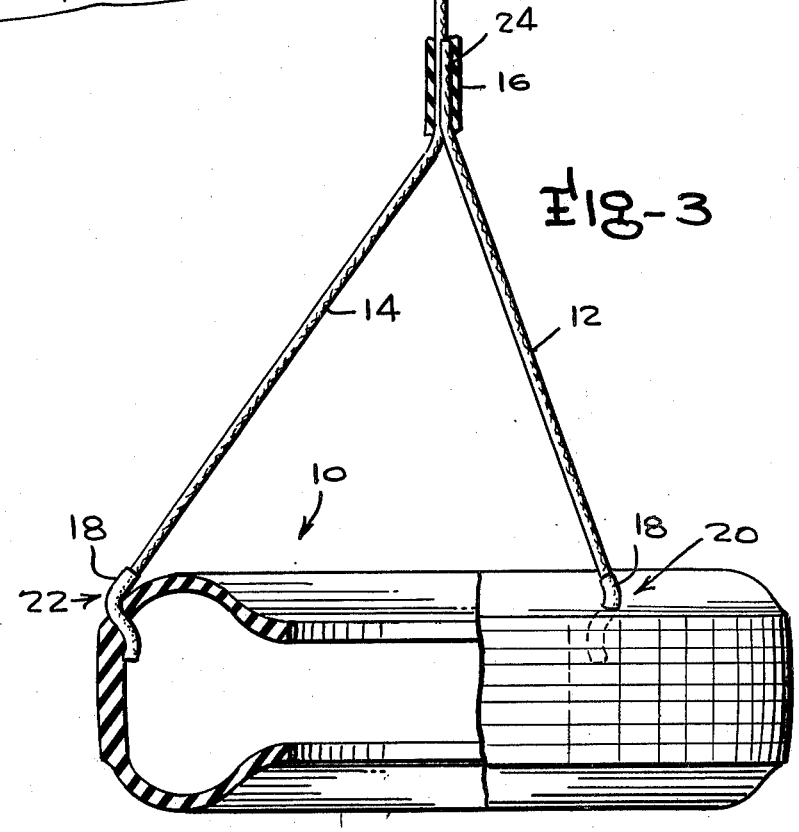
Fig-1
Fig-2
Fig-3

ELECTRIC FENCE POST STANDARD

PORTABLE ELECTRIC FENCE POST

This invention is in the field of electric fence posts and is specifically directed to the field of portable electric fence post to contain the livestock in desired areas.

Prior known electric fence posts have required insulators to prevent the relatively low voltage applied to the electric fence wire from shorting out into the ground. These posts have been inserted such as by pounding into the surface over which they traverse. However, it is often impossible to install these posts due to the impenetrability of the surface caused by frozen ground, rocks, concrete, etc. Not only are these prior art posts difficult and time consuming to install, but they are also difficult and time consuming to move because each post must be extracted from the ground and reinserted in the desired new position. These prior known posts make mowing around the posts difficult because they are permanently installed and require special gates to permit entering and leaving an enclosed area.

Therefore, it is the object of the present invention to provide a new and improved portable electric fence post.

Another object of the present invention is to provide a simple means for stringing an electric fence wire above any surface such as rocks, mud, concrete, frozen ground or normal terrain.

A further object of the present invention is to provide a portable electric fence post which may be moved easily for mowing or laid down on the ground to permit driving over the wire without requiring a gate.

A still further object of the present invention is to provide a portable electric fence post which is formed of a used vehicle tire casing to provide a stable and completely portable electric fence post.

Another object of the present invention is to provide an electric fence post which need not be disconnected from the voltage source to move the fence for expanding rotation pastures or for weed control under the electric wire.

It is a further object of the present invention to offer a completely portable electric fence post which is retained in position by gravity and held erect by a base which may be formed of a used vehicle tire casing.

It is a still further object of the present invention to provide a portable electric fence post which may be easily moved without contacting the charged fence wire and to which the fence wire may be attached with any suitable wire clip or string without requiring an additional insulator to isolate the fence wire from the ground.

Obtainment of the objects of this invention is enabled through the provision of a vehicle tire casing having three small diameter holes at equally spaced apart positions in a side wall of the tire casing with the tire casing laying on the opposite side wall to form the ground support for the fence post. Two support members are formed of concrete reinforcing rods with the lower ends bent transverse to the main portion of the support member and with the upper ends bent outwardly relative to the lower ends thereof. A post member similar to the support members except the upper end thereof is longer than the upper ends of the support members and forms the post which supports the electric fence wire. The portable electric fence post is assembled by inserting the lower ends of the support members and the post member into the holes in the side wall of the tire casing and bringing the upper ends of the members together to form a tripod. A rubber sleeve slips over the upper ends of the members with the upper end of the post member extending above the sleeve to provide a post to which the electric fence wire may be attached by any desired means. The lower ends of the members may be covered with a polyethylene tubing where they are inserted into the tire to insure against loss of current through the tire casing in extremely wet weather.

A better understanding of the manner in which the preferred embodiment of the invention achieves the objects of the invention will be enabled when the following written description is read in conjunction with the appended drawings in which:

FIG. 1 is a perspective view of the preferred embodiment;

FIG. 2 is a fragmentary top plan view of the preferred embodiment;

FIG. 3 is a fragmentary side elevational view of the preferred embodiment.

Attention is initially invited to the various figures of the drawings illustrating the preferred embodiment of the invention which includes a tire casing 10, two support members 12, a post member 14, an elastic sleeve 16 and insulating sleeve 18.

The tire casing 10 is preferably a worn out automobile tire casing although any other casing may be utilized depending on the availability and cost. In most parts of the country these casings may be secured at no cost other than the cost of transporting them to the desired location. Any size tire casing may be utilized, however, the conventional 14 or 15 inch tires from vehicles provide a stable base and are easy to transport and handle. Three holes which are one half inch in diameter are drilled in the side wall of the tire casing 10 at approximately equal distances from each other and close to the tread of the tire.

The support members 12 and the post member 14 are preferably formed of ⅜ inch concrete reinforcing rod which is readily available in most parts of the country at relatively low cost. The lower ends 20 of the post support members 12 and the lower end 22 of the post member 14 are slightly S-shaped and extend transversely from a main straight portion of the members. The upper ends of the support members extend outwardly relative to the lower ends thereof. The upper ends 24 of the support members 12 are bent outwardly relative to the lower ends 20 thereof. Similarly the upper end 26 of the post member 14 extends outwardly relative to the lower end 22 thereof and is much longer than the upper ends of the support members to provide a support for an electric fence wire 28 shown in FIG. 1. The lower ends of the support members and the post member may be covered with a 3 inch length of polyethylene tubing to insure against loss of current through the tire casing in extremely wet weather.

The fence post is assembled by inserting the lower ends of the members 12 and 14 into the holes in the side wall of the tire casing 10 which has its lower side wall resting on the ground as shown in FIG. 1 so that the lower bend of the S-shaped lower ends remain in the holes. This insertion is more easily accomplished if a lubricant such as liquid soap is first applied to the hole. The upper ends 24 and 26 of the members are brought together with the axes of the upper ends parallel to the axis of the tire. The elastic sleeve 16 which may be formed of a three quarter inch diameter by 3 inch length of plastic pipe is then slipped over the upper ends of the members and tapped down lightly with a hammer until the lower end of the sleeve coincides with the bend between the upper ends and the main portions of the members. The electric wire 28 may then be connected to the upper end 26 of the post member 14 by any suitable wire, clip or string such as the wire clip 30 shown in FIG. 1.

The portable post of the present invention may be assembled in the pasture quickly and easily as described above and may be disassembled quickly and easily for compactness of transportation and storage. The portable post of the present invention may be easily positioned on mud, ice, rocks, concrete, etc. and may be quickly and easily moved aside for mowing grasses and weeds growing adjacent a post. To leave a field it is a simple matter to tip over two adjacent posts and drive over the connected wire and the post is easily moved while the wire is charged by grasping or pushing the tire casing 10. A pasture is easily divided into smaller areas with the fence being moved as desired to increase the efficiency of pasturing by rotating the livestock through successive areas in the pasture thereby eliminating the loss caused by trampling of the livestock.

The present invention permits the utilization of used tire casings to create an extremely inexpensive and efficient portable post which may be used in any application requiring a stable, light weight upright post.

From the foregoing detailed description it will be evident that there are a number of changes, adaptations and modifications of the present invention which come within the province of those skilled in the art. However, it is intended that all such variations, not departing from the spirit of the invention, be considered as within the scope thereof as limited solely by the appended claims.

I claim:

1. A collapsible and portable post for supporting a conventional electric fence wire to provide an easily transported enclosure for livestock, said post comprising a tire casing having three spaced apart holes in a wall thereof, said tire casing providing an insulating base for said post, three support members with each support member formed of a rod having an S-shaped lower end extending transversely from a main portion thereof and an upper end inclined outwardly relative to the lower end thereof, said S-shaped lower ends inserted into said holes in the tire casing with a portion of the S-shaped lower end engaging an inner surface of said wall, and a means for connecting said upper ends of said support members, thereby creating a tripod base above said tire casing wherein an electric fence wire may be connected to one of said members and a plurality of said posts may be assembled to form a portable enclosure for livestock.

2. The portable electric fence post of claim 1 wherein the means for connecting the upper ends of the elongated members comprises an elastic sleeve which is stretched around a portion of the upper ends of the support members.

3. The portable post of claim 1 additionally including insulating sleeves extending over the lower ends of said members.

4. The portable post of claim 1 wherein the holes in the tire casing extend through a side wall thereof at approximately equal distances from each other and close to the tread of the tire.

* * * * *